US010584902B2

(12) United States Patent
Ros Ruiz et al.

(10) Patent No.: US 10,584,902 B2
(45) Date of Patent: Mar. 10, 2020

(54) SUPPORT DEVICE FOR A ROTATING SHAFT OF A SOLAR TRACKER

(71) Applicant: SOLTEC ENERGIAS RENOVABLES, S.L., Murcia (ES)

(72) Inventors: Antonio Jose Ros Ruiz, Murcia (ES); Francisco Salinas Ruiz, Murcia (ES)

( * ) Notice: Subject to any disclaimer, the term of this patent is extended or adjusted under 35 U.S.C. 154(b) by 0 days.

(21) Appl. No.: 15/994,047

(22) Filed: May 31, 2018

(65) Prior Publication Data

US 2018/0347859 A1     Dec. 6, 2018

(30) Foreign Application Priority Data

May 31, 2017   (EP) .................................... 17382323

(51) Int. Cl.
| | |
|---|---|
| *F16L 3/24* | (2006.01) |
| *F24S 80/00* | (2018.01) |
| *H02S 20/32* | (2014.01) |
| *F24S 30/425* | (2018.01) |
| *F16B 7/04* | (2006.01) |
| *F24S 25/00* | (2018.01) |
| *F24S 30/00* | (2018.01) |

(52) U.S. Cl.
CPC ............ *F24S 80/00* (2018.05); *F16B 7/0486* (2013.01); *F24S 30/425* (2018.05); *H02S 20/32* (2014.12); *F24S 2025/019* (2018.05); *F24S 2030/15* (2018.05)

(58) Field of Classification Search
CPC ......... F24S 80/00; F24S 30/425; H02S 20/32; F16B 7/0486; F16L 3/24; F16L 3/243; F16L 3/2431; F16L 3/245

USPC ........ 248/65, 70, 71, 73, 74.1, 74.4, 125.2, 248/122.1, 226.12, 230.1, 230.5, 231.61, 248/68.1

See application file for complete search history.

(56) References Cited

U.S. PATENT DOCUMENTS

| | | | | |
|---|---|---|---|---|
| 906,806 | A | * 12/1908 | Kortick | ................ F16L 3/1008 248/62 |
| 4,186,902 | A | * 2/1980 | Simons | .................. H01B 17/16 174/163 R |
| 4,371,137 | A | * 2/1983 | Anscher | .................... F16L 3/23 24/16 PB |

(Continued)

FOREIGN PATENT DOCUMENTS

| | | |
|---|---|---|
| DE | 202015106538 U1 | 1/2016 |
| EP | 2735817 A2 | 5/2014 |
| ES | 1119081 U | 8/2014 |

*Primary Examiner* — Terrell L McKinnon
*Assistant Examiner* — Michael McDuffie
(74) *Attorney, Agent, or Firm* — Eugenio J. Torres-Oyola; Victor M. Rodriguez-Reyes; Rafael Rodriguez-Muriel

(57) ABSTRACT

The support device for a rotating shaft of a solar tracker comprises a support plate (2) fixed to an upper end of a support column (1), and a clamp (3) comprising a lower clamp section (4) with a foot (7) fixed to the support plate (2) by means of screws (43) and an arcuate seat (9) for a bearing (52), and first and second opposite side clamp sections (5, 6) having upper ends at which there are arranged respective connecting elements (10, 11) connectable in an articulated manner to one another and lower ends at which there are arranged respective fixing and clamping elements (12, 13) configured for fitting onto the foot (7) and for being tightened against one another and against the lower clamp section (4) by means of a tightening screw (14).

15 Claims, 7 Drawing Sheets

(56) References Cited

U.S. PATENT DOCUMENTS

| | | | | |
|---|---|---|---|---|
| 4,557,447 A * | 12/1985 | Combe | F16L 3/127 | 248/62 |
| 4,804,158 A * | 2/1989 | Collins | F16L 59/135 | 248/74.4 |
| 7,455,277 B2 * | 11/2008 | Bishop | E05B 73/00 | 248/156 |
| 7,546,986 B2 * | 6/2009 | Kim | F16L 3/1008 | 248/62 |
| 8,047,476 B2 * | 11/2011 | Van Walraven | F16L 3/1016 | 248/74.4 |
| 8,413,933 B2 * | 4/2013 | Benne | F16L 3/11 | 248/62 |
| 9,035,168 B2 * | 5/2015 | Barton | H02S 20/32 | 136/246 |
| 9,206,999 B2 * | 12/2015 | Reed | H02S 20/32 | |
| 9,455,664 B2 * | 9/2016 | Barton | H02S 20/32 | |
| 9,819,301 B2 * | 11/2017 | Ripoll Agullo | H02S 20/00 | |
| 9,845,824 B2 * | 12/2017 | Lamb | F16C 13/04 | |
| 2002/0171013 A1 * | 11/2002 | Nicolia | F16L 3/133 | 248/74.1 |
| 2003/0094547 A1 * | 5/2003 | Wilkinson, III | F16L 3/1008 | 248/74.1 |
| 2008/0142647 A1 * | 6/2008 | Connelly | F16L 55/035 | 248/74.1 |
| 2011/0253195 A1 * | 10/2011 | Kim | H02S 20/00 | 136/246 |
| 2012/0180845 A1 | 7/2012 | Cole | | |
| 2012/0219243 A1 | 8/2012 | Jang | | |
| 2013/0039610 A1 | 2/2013 | Schneider | | |
| 2014/0346291 A1 * | 11/2014 | Booth | H02G 7/053 | 248/74.4 |
| 2015/0090316 A1 * | 4/2015 | Song | H02S 20/32 | 136/246 |
| 2016/0047496 A1 * | 2/2016 | O'Connell | F16L 59/16 | 248/72 |
| 2017/0234580 A1 * | 8/2017 | Worden | F16C 35/02 | 126/606 |
| 2018/0062565 A1 * | 3/2018 | Schimelpfenig | H02S 20/32 | |
| 2018/0254740 A1 * | 9/2018 | Corio | F24S 30/425 | |

\* cited by examiner

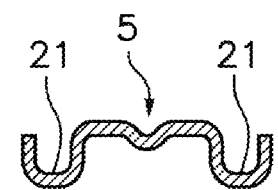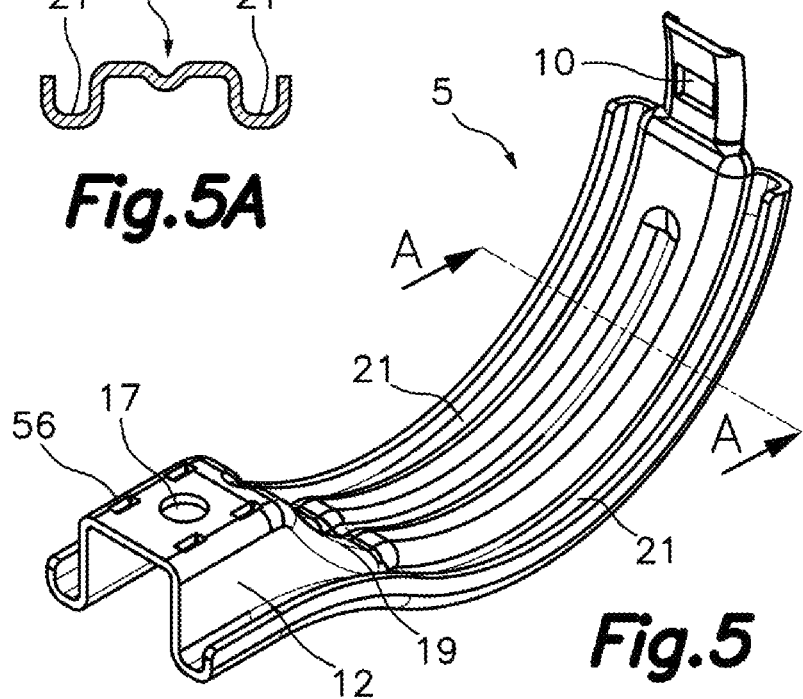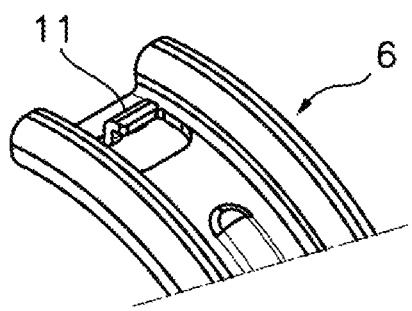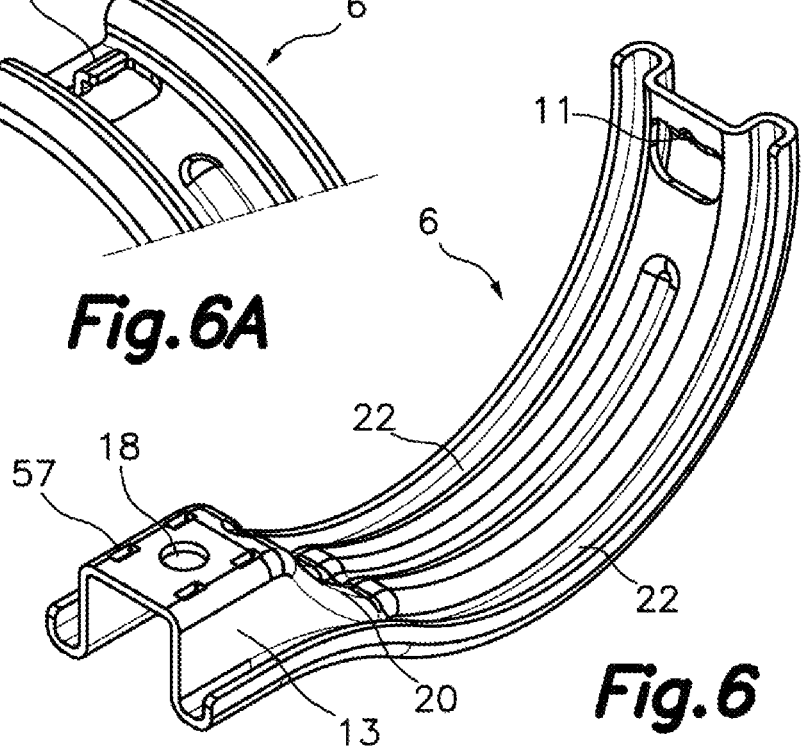

SUPPORT DEVICE FOR A ROTATING SHAFT OF A SOLAR TRACKER

CROSS-REFERENCE TO RELATED APPLICATIONS

This application claims foreign priority to European Application No. EP17382323 filed on May 31, 2017, the content of which is hereby incorporated by reference in its entirety.

FIELD OF THE ART

The present invention relates to a support device for a rotating shaft of a solar tracker comprising a support column suitable for being anchored to the ground, a support plate fixed to an upper end of said support column, and a clamp connected to the support plate, the clamp being configured for clamping and holding tightly onto a bearing arranged around the rotating shaft of the solar tracker.

BACKGROUND OF THE INVENTION

Document ES1119081U discloses a support device for a rotating shaft of a solar tracker comprising a support column suitable for being anchored to the ground, a support plate fixed to an upper end of said support column, and a clamp connected to the support plate through a hinge which allows rotation about a horizontal axis perpendicular to the axis of the clamp. The support plate is attached to a lower element of the hinge by welding. The clamp comprises a lower clamp section attached by a connecting element to an upper element of the hinge by means of welds and an upper clamp element which is connected to the lower clamp element by means of tightening screws inserted into holes formed in facing end protrusions of both lower and upper clamp elements.

The existence of welded attachments between several parts making up the support device described in the cited document ES1119081U causes the manufacturing process to be slow and expensive, and the existence of the hinge complicates installation and assembly tasks.

The support device of the present invention stems from the need to simplify installation and assembly tasks and allow increases in production rates as a result of the implementation of manufacturing processes such as sheet metal stamping.

DISCLOSURE OF THE INVENTION

The present invention contributes to mitigate the foregoing and other drawbacks by providing a support device for a rotating shaft of a solar tracker comprising a support column suitable for being anchored to the ground, a support plate fixed to an upper end of the support column, and a clamp connected to the support plate. The clamp has a lower clamp section, and first and second opposite side clamp sections coupleable to one another providing clamping surfaces suitable for clamping and holding tightly onto a bearing arranged around the rotating shaft of the solar tracker.

The lower clamp section has a foot configured for being fixed to the support plate by means of foot fixing screws and an arcuate seat configured for receiving a lower surface of the bearing.

The first and second side clamp sections are configured for receiving surfaces of the bearing not covered by the arcuate seat and for being superposed on opposite upper portions of the arcuate seat. The first and second side clamp sections furthermore have upper ends at which there are arranged respective connecting elements connectable in an articulated manner to one another and lower ends at which there are arranged respective fixing and clamping elements configured for fitting onto the foot of the lower clamp section and for being tightened against one another and against the lower clamp section by means of a tightening screw.

In one embodiment, the mentioned connecting elements comprise a connecting opening formed in the first side clamp section and a connecting hook arranged in the second side clamp section. The connecting hook can be inserted into the connecting opening such that it is hooked therein providing a fulcrum.

The foot preferably has two foot walls arranged spaced apart from and facing one another, the foot walls extending downwardly from opposite sides of the arcuate seat defining a passage between the arcuate seat and the support plate, and the fixing and clamping elements of the first and second side clamp sections comprise respective holes facing the passage for installing the tightening screw through the passage. The two foot walls of the foot, arranged spaced apart from and facing one another, have lower ends attached to horizontal plates provided with slots for installing the foot fixing screws. Optionally, side ends of the horizontal plates are connected to the foot walls by means of reinforcement brackets.

The first and second side clamp sections preferably have respective recessed inner portions in which the opposite upper portions of the arcuate seat are housed and respective inner grooves configured for receiving projecting ribs of the bearing. The bearing is therefore restrained from moving in an axial direction in the first and second side clamp sections.

In one embodiment, the support plate comprises first and second L-shaped support plate elements having respective vertical sections configured for being fixed to the support column and respective horizontal sections superposed on one another at least partially, the horizontal sections having respective slots coinciding with one another and coinciding with the slots existing on the horizontal plates of the foot for installing the foot fixing screws. Optionally, the slots existing on the horizontal plates of the foot are arranged in horizontal directions inclined with respect to an axis of the clamp and the slots existing in the horizontal sections of the first and second support plate elements are arranged in horizontal directions perpendicular to the axis of the clamp.

Preferably, the horizontal section of the first support plate element has downwardly turned longitudinal guiding flanges configured for cooperating with longitudinal edges of the horizontal section of the second support plate element constituting a guide for the relative positioning of the first and second support plate elements in a horizontal direction perpendicular to the axis of the clamp.

In one embodiment, the support column has two vertical walls parallel to one another and the vertical sections of the first and second support plate elements have slots arranged in vertical directions perpendicular to the axis of the clamp coinciding with holes existing in the vertical walls of the support column for installing plate fixing screws therethrough. Optionally, the vertical sections of the first and second support plate elements have respective reinforcement flanges extending perpendicularly outwards from vertical edges thereof.

For example, the support column can be an I-shaped profile, an H-shaped profile or a C-shaped profile. Besides the support column and the nuts and bolts, the support device of the present invention is made up of five parts, namely the first and second support plate elements forming the support plate as well as the lower clamp section and the first and second side clamp sections forming the clamp, each of which is formed from a single sheet metal element having a uniform thickness and including folds, recesses and holes, that can be obtained using a stamping process.

Furthermore, the different elements making up the support device of the present invention are connected to one another by means of screws inserted through slots which, together with predetermined dimensional tolerances, allow for different linear and angular adjustments in the assembly in order to absorb unevenness in the terrain in which the solar tracker is installed, which allows dispensing with the hinge existing in some of the support devices of the prior art.

BRIEF DESCRIPTION OF THE DRAWINGS

The foregoing and other features and advantages will be better understood based on the following detailed description of several merely illustrative and non-limiting embodiments with reference to the attached drawings, in which:

FIGS. 5 and 6 are perspective views of a first side clamp section and a second side clamp section, respectively, forming part of the clamp of the support device;

FIG. 5A is a cross-section view taken along plane A-A of FIG. 5;

FIG. 6A is a partial view showing an outer side of the upper end of the second side clamp section of FIG. 6;

DETAILED DESCRIPTION OF AN EMBODIMENT

Figure 1:
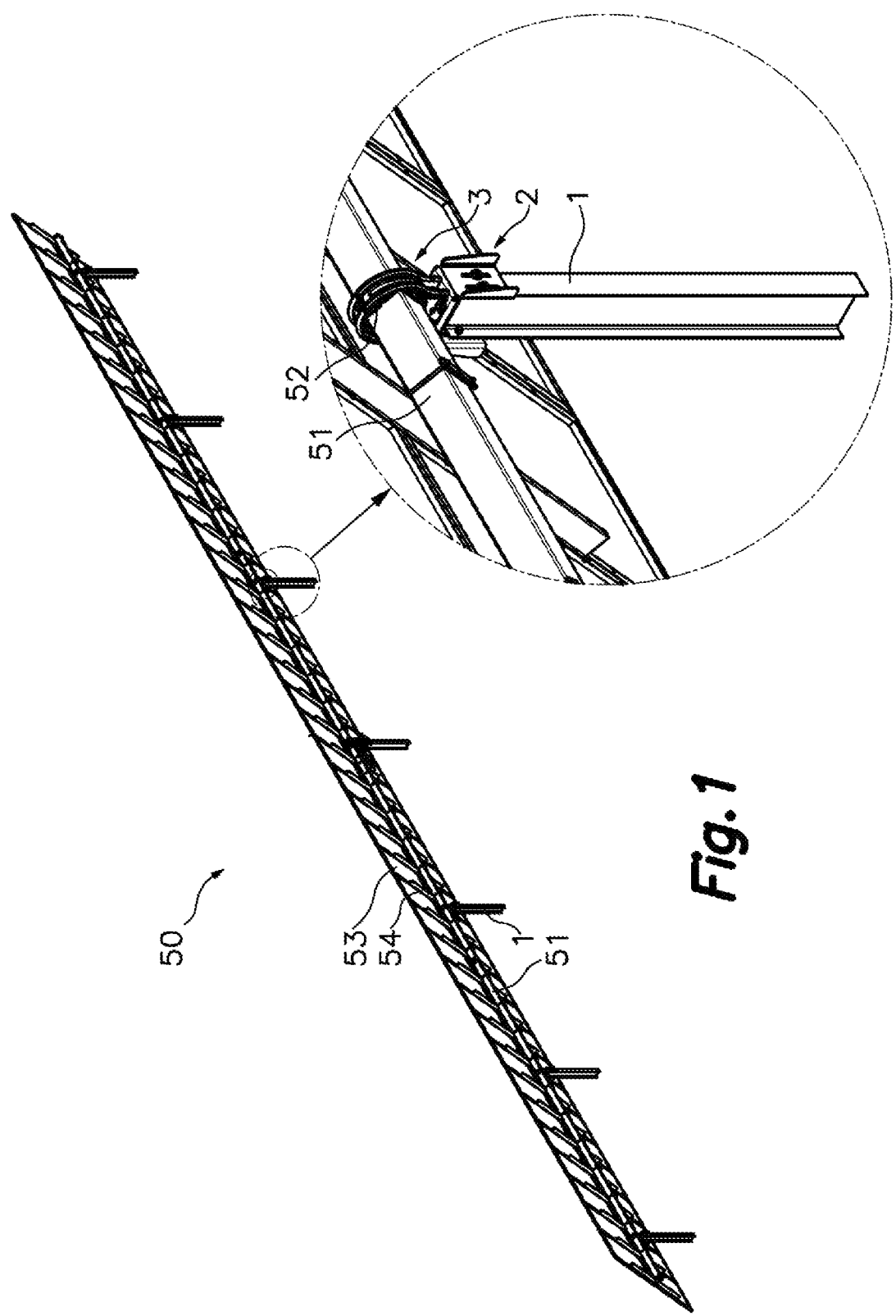
FIG. 1 is a perspective view with an enlarged detail of a single-axis solar tracker including a plurality of support devices according to one embodiment of the present invention for supporting a rotating shaft of the solar tracker.

Referring first to FIG. 1, the reference sign 50 generally designates a solar tracker 50 comprising a rotating shaft 51 rotatably supported by a plurality of support devices according to one embodiment of the present invention. A plurality of photovoltaic panels 53 are fixed to the rotating shaft 51 by support arms 54, and a motor (not shown) rotates the rotating shaft according to relative movements of the sun.

The enlarged detail of FIG. 1 shows one of the support device of the present invention, which comprises a support column 1 suitable for being anchored to the ground, a support plate 2 fixed to an upper end of the support column 1, and a clamp 3 connected to the support plate 2. The clamp 3 has several sections coupleable to one another providing clamping surfaces suitable for clamping and holding tightly onto a bearing 52 arranged around the rotating shaft 51 of the solar tracker 50. The clamp 3 has an axis E (FIG. 10) coinciding with the axis of the rotating shaft 51 and the axis of the bearing 52.

Figures 2, 3:
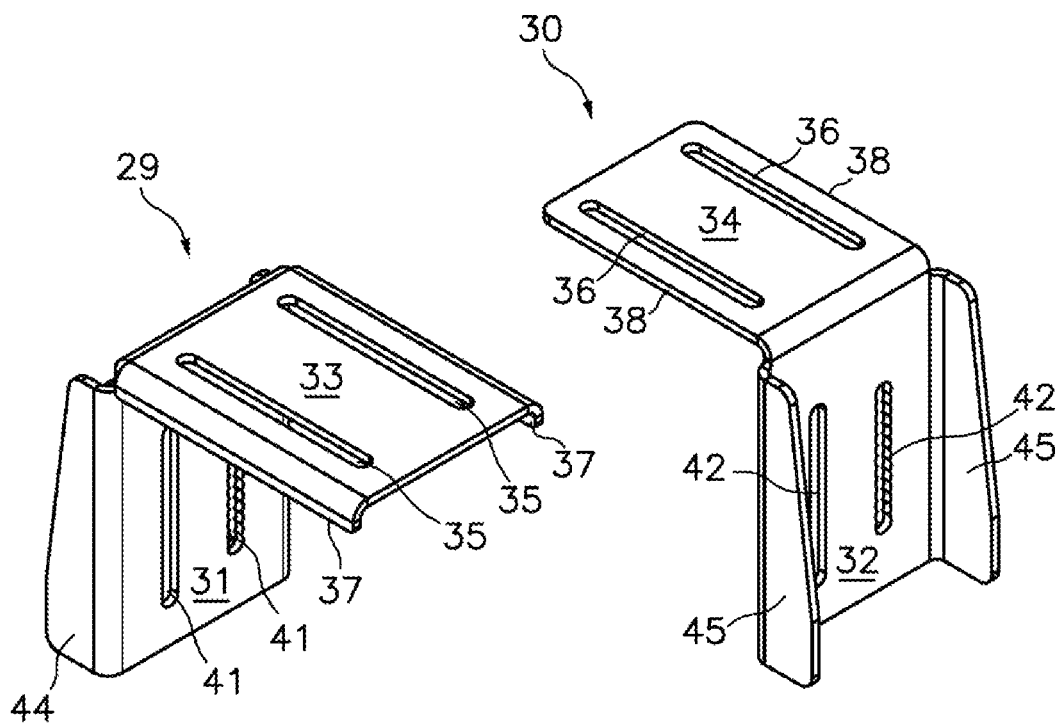
FIGS. 2 and 3 are perspective views of a first support plate element and a second support plate element, respectively, forming part of a support plate of the support device.

As better shown in FIGS. 2 and 3, the support plate 2 comprises first and second L-shaped support plate elements 29, 30, each of which is formed from a single sheet metal element having a uniform thickness and including folds, recesses and holes. The first and second support plate elements 29, 30 can therefore be easily obtained using a stamping process.

The first and second support plate elements 29, 30 have respective vertical sections 31, 32 configured for being fixed to the support column 1 and respective horizontal sections 33, 34 which, once assembled, are superposed on one another at least partially. The vertical sections 31, 32 have slots 41, 42 arranged in vertical directions perpendicular to the axis E of the clamp 3 and the horizontal sections 33, 34 have respective slots 35, 36 (with smooth or notched sides) which coincide with one another once the horizontal sections 33, 34 are superposed.

The horizontal section 33 of the first support plate element 29 has guiding flanges 37 perpendicular to the axis E of the clamp 3 and the horizontal section 34 of the second support plate element 30 has edges 38 perpendicular to the axis E of the clamp 3 cooperating with the guiding flanges 37 for guiding relative positioning of the first and second support plate elements 29, 30 when both elements are assembled to one another. The vertical sections 31, 32 of the first and second support plate elements 29, 30 have respective reinforcement flanges 44, 45 extending perpendicularly outwards from vertical edges thereof.

Figure 7:
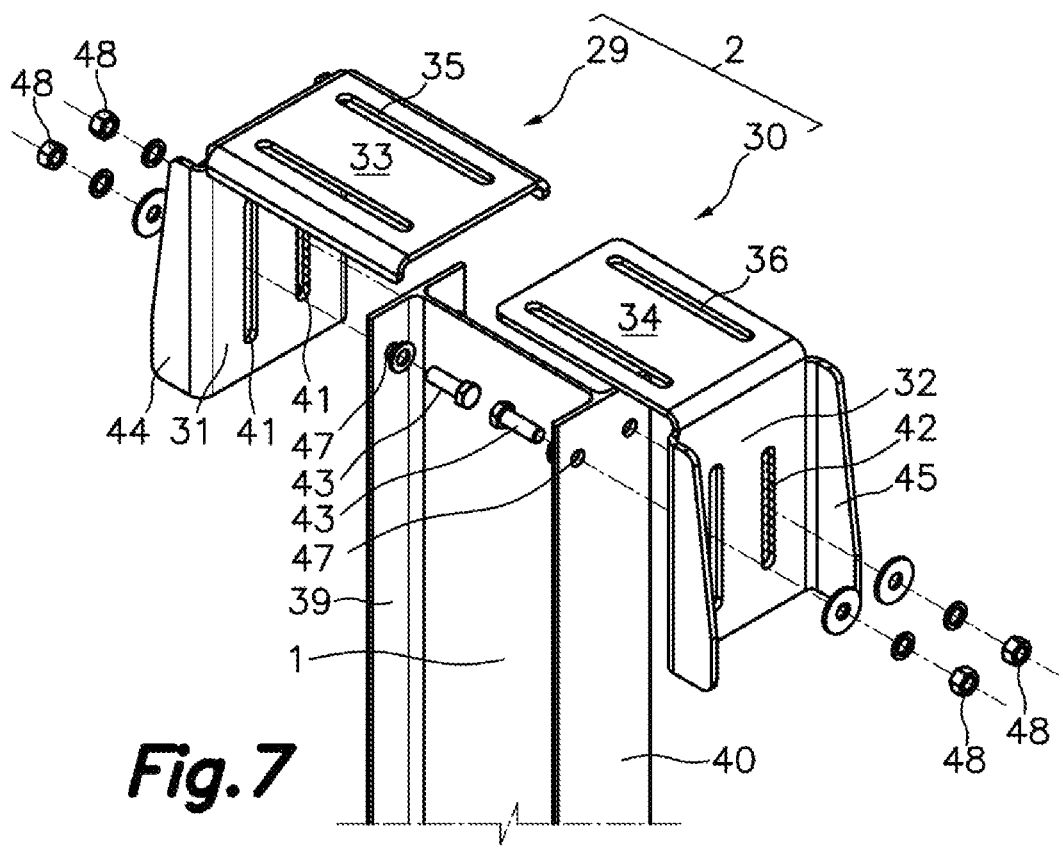
FIG. 7 is an exploded perspective view showing the assembly of the first and second support plate elements forming the support plate on a support column forming part of the support device.

FIG. 7 illustrates the assembly of the first and second support plate elements 29, 30 on the support column 1. The support column 1 has two vertical walls 39, 40 parallel to one another in which there are holes 47. The slots 41, 42 (with smooth or notched sides) of the vertical sections 31, 32 of the first and second support plate elements 29, 30 coincide with the holes 47 existing in the vertical walls 39, 40 of the support column 1. Plate fixing screws 43 are installed through the slots 41, 42 of the first and second support plate elements 29, 30 and the holes 47 of the support column and secured by means of nuts 48. The slots 41, 42 of the first and second support plate elements 29, 30 allow linear positional adjustment and up to a certain point angular positional adjustment of the support plate 2 in relation to the support column 1.

Figure 9:
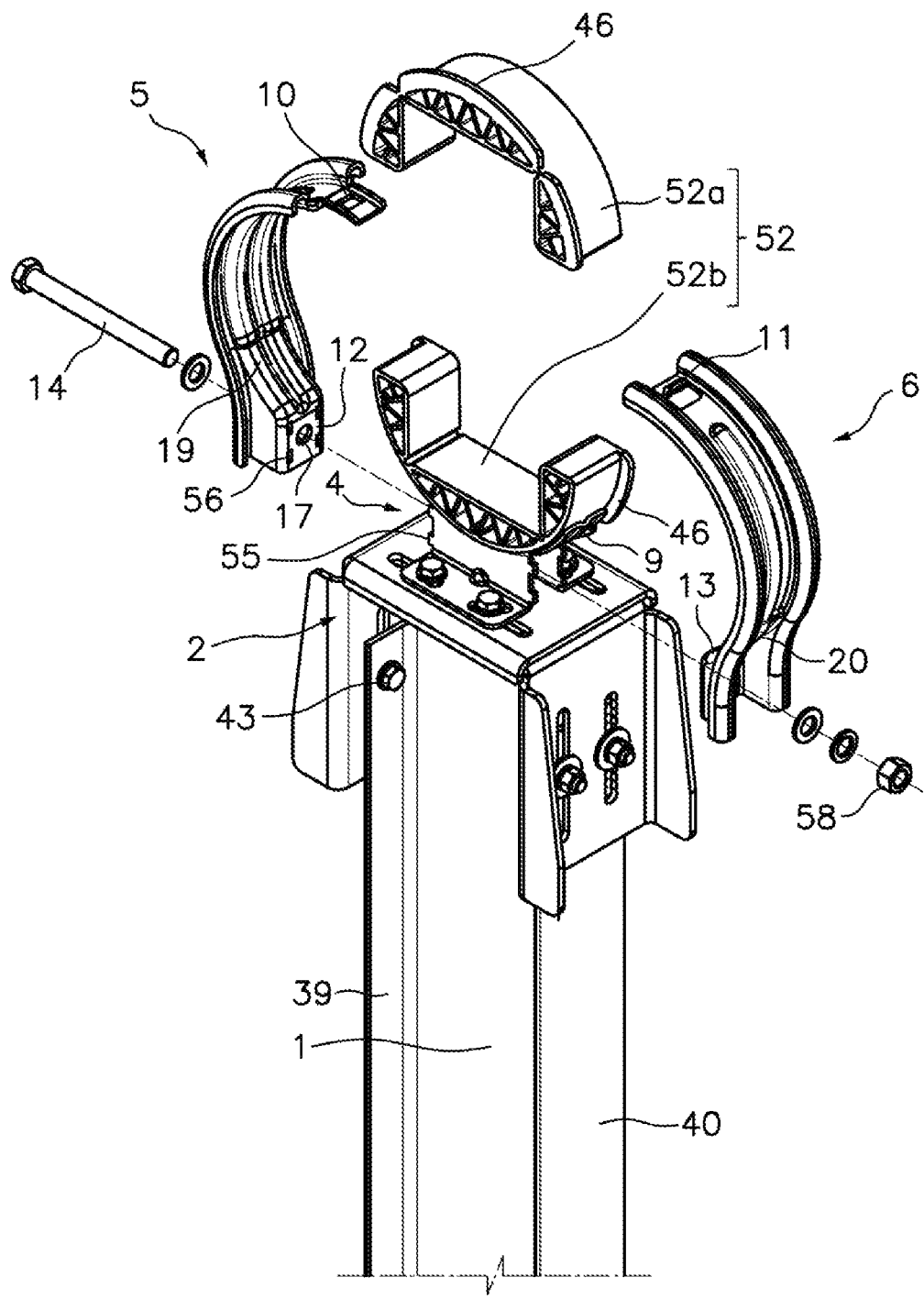
FIG. 9 is an exploded perspective view showing the assembly of the first and second side clamp sections on the lower clamp section for holding and supporting a bearing in cooperation with the lower clamp section.

As shown in FIG. 9, the clamp 3 comprises a lower clamp section 4 and first and second opposite side clamp sections 5, 6. Both the lower clamp section 4 and each of the first and second side clamp sections 5, 6 of the clamp 3 is formed from a single sheet metal element having a uniform thickness and including folds, recesses and holes. Therefore, the lower clamp section 4 and the first and second side clamp sections 5, 6 can be easily obtained using a stamping process.

The bearing 52 is made up of two bearing halves 52a, 52b made of a material with a low coefficient of friction and, once assembled, the two bearing halves 52a, 52b define an outer cylindrical frictional surface in sliding contact with the clamp 3 and an inner prismatic surface that is coupled to the rotating shaft 51 with no possibility of rotating thereabout.

Figure 4:
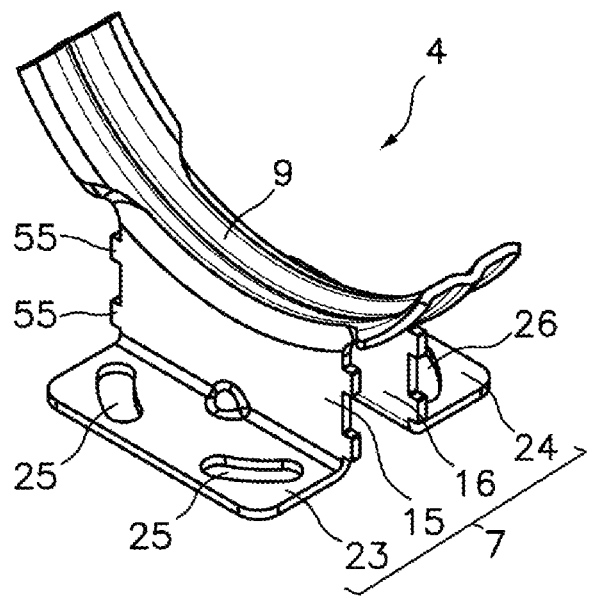
FIG. 4 is a perspective view of a lower clamp section forming part of a clamp of the support device.

FIG. 4 shows the lower clamp section 4, which has a foot 7 configured for being fixed to the support plate 2 and an arcuate seat 9 configured for receiving a lower surface of the bearing 52 (see also FIG. 9). The foot 7 has two foot walls 15, 16 arranged spaced apart from and facing one another, the foot walls extending downwardly from opposite sides of the arcuate seat 9 defining a passage between the arcuate seat 9 and the support plate 2, and the two foot walls 15, 16 have lower ends attached to horizontal plates 23, 24 provided with slots 25, 26 arranged in inclined horizontal directions with respect to the axis E of the clamp 3. Fitting tabs 55 extend from side edges of the foot wall 15, 16.

Figure 8:
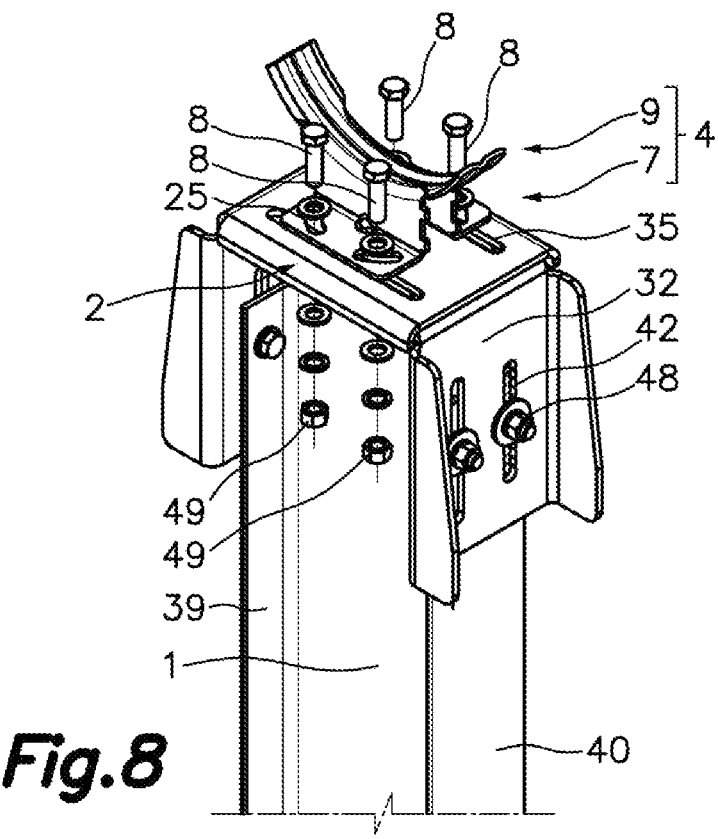
FIG. 8 is an exploded perspective view showing the assembly of the lower clamp section on the support plate.

FIG. 8 illustrates the assembly of the lower clamp section 4 of the clamp 3 on the support plate 2. The slots 25, 26 existing on the horizontal plates 23, 24 of the foot 7 of the lower clamp section 4 coincide with the slots 35, 36 of the superposed horizontal sections 33, 34 of the first and second support plate elements 29, 30 fixed to the support column 1. Foot fixing screws 8 are installed through slots 25, 26 of the lower clamp section 4 and slots 35, 36 of the first and second support plate elements 29, 30 of the support plate 2 and secured by means of nuts 49. Therefore, the slots 25, 26, and 35, 36 allow for linear and angular positional adjustment of the lower clamp section 4 in relation to the support plate 2.

FIGS. 5, 5A, 6 and 6A show the first and second side clamp sections 5, 6, which are configured for receiving surfaces of the bearing 52 not covered by the arcuate seat 9 and for being superposed on opposite upper portions of the arcuate seat 9 (see FIG. 9). The first and second side clamp sections 5, 6 have respective recessed inner portions 19, 20 in which the opposite upper portions of the arcuate seat 9 are housed (see also FIG. 10) and respective inner grooves 21, 22 along the longitudinal edges thereof in which projecting ribs 46 formed in the two bearing halves 52a, 52b of the bearing 52 are inserted (FIG. 9).

FIG. 5a shows in cross-section the inner grooves 21 of the first side clamp section 5, which are identical to the inner grooves 22 of the second side clamp section 6.

Figure 10:
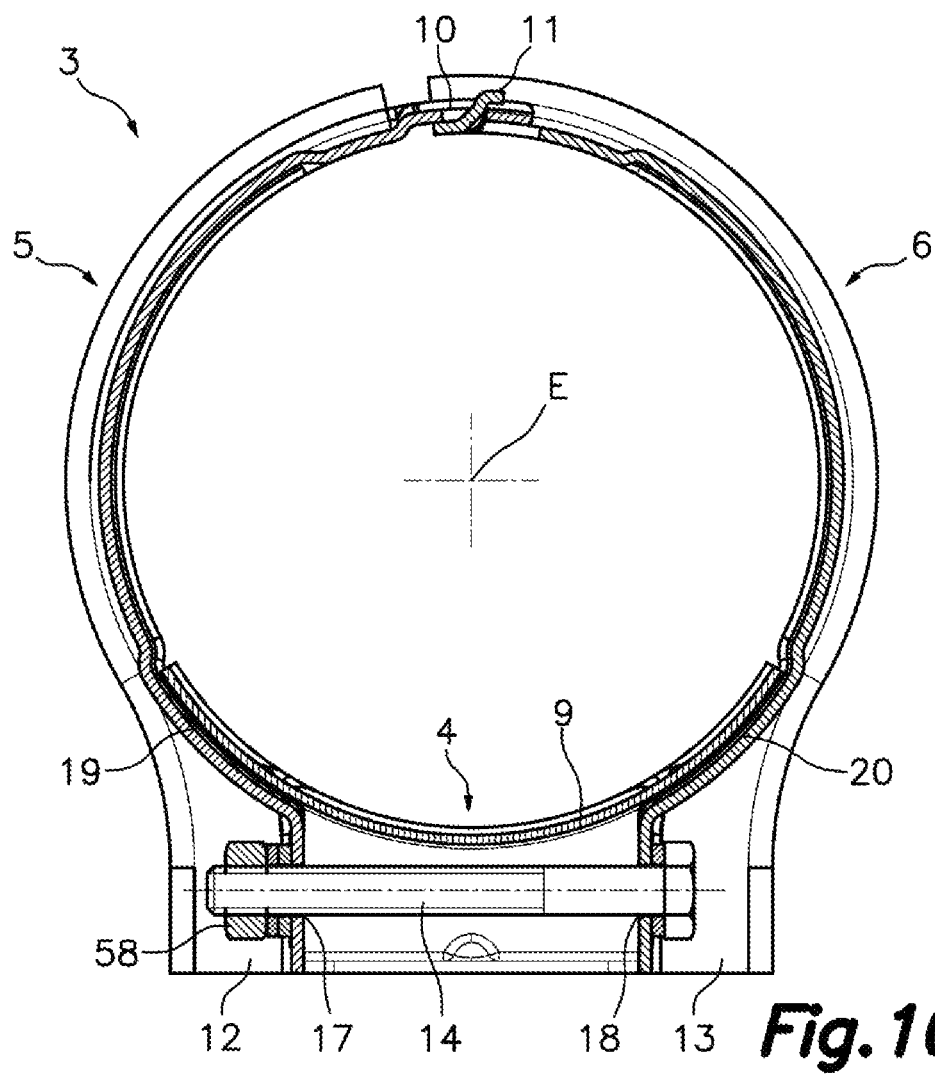
FIG. 10 is a cross-section view of the clamp taken along a vertical midplane perpendicular to an axis of the clamp.

At an upper end of the first side clamp section 5 there is a connecting opening 10 and at an upper end of the second side clamp section 6 there is a connecting hook 11 (FIG. 6A) that can be inserted into the connecting opening 10 of the first side clamp section 5. The connecting opening 10 and the connecting hook 11 are connectable to one another in an articulated manner, as shown in FIG. 10. At the lower ends of the first and second side clamp sections 5, 6, there are respective fixing and clamping elements 12, 13 including respective holes 17, 18 and respective fitting openings 56, 57.

FIG. 9 illustrates the assembly of the first and second side clamp sections 5, 6 on the lower clamp section 4, holding the two bearing halves 52a, 52b of the bearing 52. One of the bearing halves 52b is placed on the arcuate seat 9 of the lower clamp section 4 and then the rotating shaft 51 (not shown in FIG. 9) and the other bearing half 52a are placed, completing the bearing 52 around the rotating shaft 1.

The connecting hook 11 of the second side clamp section 6 is then hooked in the connecting opening 10 of the first side clamp section 5 and both the first and second side clamp sections 5, 6 are closed on the bearing 52 and the lower clamp section 4 such that the fitting tabs 55 of the lower clamp section 4 are snugly inserted into the fitting openings 56, 57 of the fixing and clamping elements 12, 13 of the first and second side clamp sections 5, 6 and the holes 17, 18 existing in the fixing and clamping elements 12, 13 of the first and second side clamp sections 5, 6 are arranged facing opposite ends of the passage provided by the two foot walls 15, 16 of the lower clamp section 4.

In this position, the ribs 46 projecting from the outer cylindrical surface of the two bearing halves 52a, 52b of the bearing 52 are inserted into the inner grooves 21, 22 of the first and second side clamp sections 5, 6, whereby the bearing 52 is restrained from moving in an axial direction in the first and second side clamp sections 5, 6 but with the possibility of rotating freely about the axis E of the clamp 3.

Finally, a tightening screw 14 is inserted through the holes 17, 18 of the first and second side clamp sections 5, 6 and along the passage provided by the lower clamp section 4 below the arcuate seat 9 and the tightening screw 14 is secured by means of a nut 58, so the fixing and clamping elements 12, 13 of the first and second side clamp sections 5, 6 are fitted onto the foot 7 of the lower clamp section 4 and tightened against one another and against the lower clamp section 4 by means of the tightening screw 14.

Figure 11:
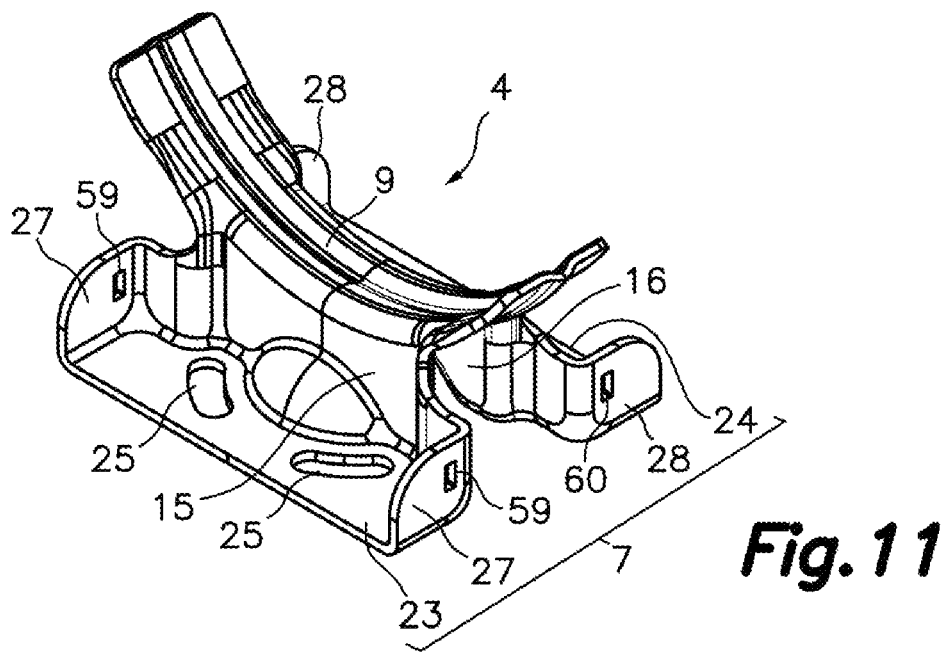
FIG. 11 is a perspective view of a lower clamp section forming part of a clamp according to an alternative embodiment of the present invention.
Figure 12:
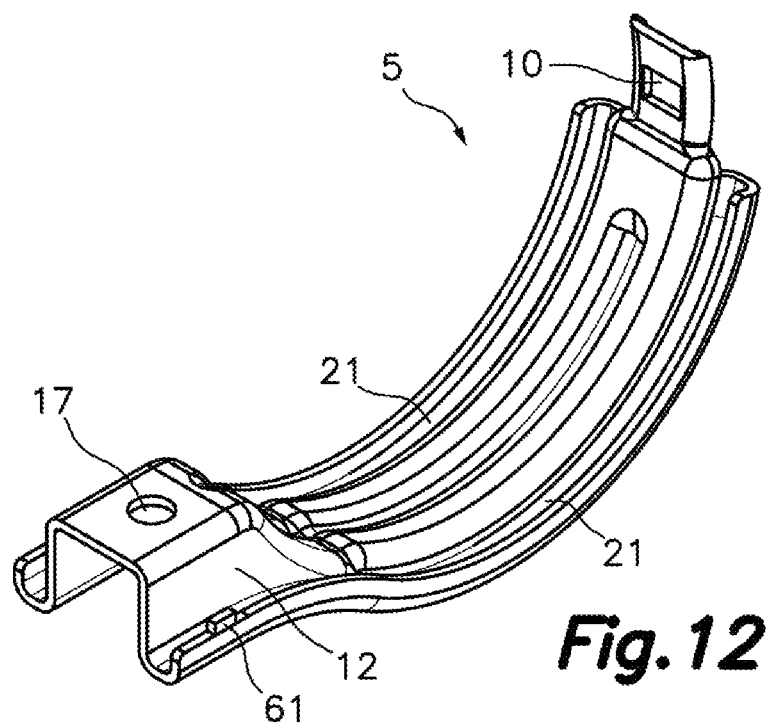
FIGS. 12 and 13 are perspective views of a first side clamp section and a second side clamp section, respectively, forming part of the clamp according to the alternative embodiment.
Figure 13:
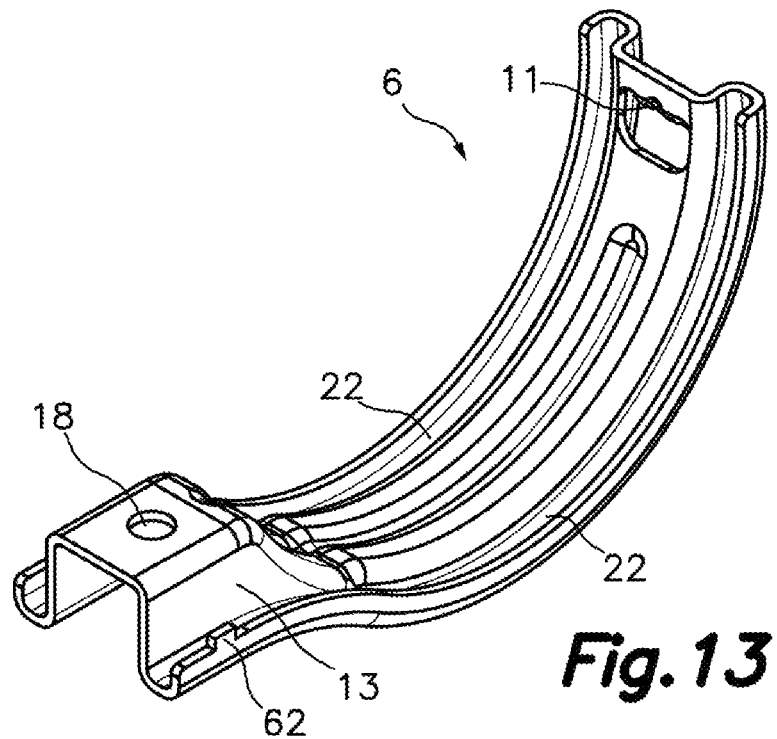

FIGS. 11 to 13 show a lower clamp section 4 and first and second side clamp sections 5, 6, respectively, of a support device according to an alternative embodiment of the present invention, which is in all similar to the embodiment described above in relation to FIGS. 1 to 10 except that, in this alternative embodiment, the foot wall 15, 16 and the horizontal plates 23, 24 of the foot 7 of the lower clamp section 4 are connected to one another at side ends thereof by reinforcement brackets 27, 28 having fitting openings 59, 60, and that respective fitting tabs 61, 62 project from longitudinal edges of the first and second side clamp sections 5, 6, in positions adjacent to the fixing and clamping elements 12, 13.

When the first and second side clamp sections 5, 6 are assembled to one another and on the lower clamp section 4, in a similar manner as has been described above in relation to FIGS. 9 and 10, the fitting tabs 61, 62 of the first and second side clamp sections 5, 6 are inserted into the fitting openings 59, 60 of the lower clamp section 4.

The scope of the present invention is defined in the attached claims.

What is claimed is:

1. A support device for a rotating shaft of a solar tracker, comprising a support column suitable for being anchored to the ground, a support plate fixed to an upper end of said support column, and a clamp connected to said support plate, said clamp having at least two sections coupleable to one another providing clamping surfaces suitable for clamping and holding tightly onto a bearing arranged around the rotating shaft of the solar tracker, characterized in that the clamp comprises:

a lower clamp section having a foot configured for being fixed to the support plate by means of foot fixing screws and an arcuate seat configured for receiving a lower surface of said bearing; and first and second opposite side clamp sections configured for receiving surfaces of the bearing not covered by said arcuate seat and for being superposed on opposite upper portions of the arcuate seat, said first and second side clamp sections having upper ends at which there are arranged respective connecting elements connectable in an articulated manner to one another and lower ends at which there are arranged respective fixing and clamping elements configured for fitting onto said foot of said lower clamp section and for being tightened against one another and against the lower clamp section by means of a tightening screw; wherein said foot has two foot walls arranged spaced apart from and facing one another, said foot walls extending downwardly from opposite sides of the arcuate seat defining a passage between the arcuate seat and the support plate, and said fixing and clamping elements of the first and second side clamp sections comprise respective holes facing said passage for installing said tightening screw through the passage; and wherein the first and second side clamp sections have respective inner grooves configured for receiving ribs of the bearing and for restraining the bearing from moving in an axial direction in the first and second side clamp sections.

2. The support device according to claim 1, wherein said connecting elements comprise a connecting opening formed in the first side clamp section and a connecting hook arranged in the second side clamp section, said connecting hook being able to be inserted into said connecting opening.

3. The support device according to claim 1, wherein the first and second side clamp sections have respective recessed inner portions in which said opposite upper portions of the arcuate seat are housed.

4. The support device according to claim 1, wherein said two foot walls of the foot have lower ends attached to horizontal plates provided with slots for installing said foot fixing screws.

5. The support device according to claim 4, wherein said horizontal plates have side ends connected to the foot wall by means of reinforcement brackets.

6. The support device according to claim 4, wherein the support plate comprises first and second L-shaped support plate elements having respective vertical sections configured for being fixed to the support column and respective horizontal sections superposed on one another at least partially, said horizontal sections having respective slots coinciding with one another and coinciding with said slots existing in said horizontal plates of the foot for installing the foot fixing screws.

7. The support device according to claim 6, wherein said slots existing on the horizontal plates of the foot are arranged in inclined horizontal directions with respect to an axis of the clamp and said slots existing in the horizontal sections of said first and second support plate elements are arranged in horizontal directions perpendicular to said axis of the clamp.

8. The support device according to claim 6, wherein the horizontal section of the first support plate element has guiding flanges perpendicular to the axis of the clamp configured for cooperating with edges perpendicular to the axis of the clamp of the horizontal section of the second support plate element for guiding relative positioning of the first and second support plate elements.

9. The support device according to claim 6, wherein the support column has two vertical walls parallel to one another and said vertical sections of said first and second support plate elements have slots arranged in vertical directions perpendicular to the axis of the clamp coinciding with holes existing in said vertical walls of the support column for installing plate fixing screws therethrough.

10. The support device according to claim 6, wherein the vertical sections of said first and second support plate elements have respective reinforcement flanges extending perpendicularly outwards from vertical edges thereof.

11. The support device according to claim 6, wherein each of said first and second support plate elements of the support plate is formed from a single sheet metal element having a uniform thickness and including folds, recesses and holes.

12. The support device according to claim 1, wherein said lower clamp section of the clamp is formed from a single sheet metal element having a uniform thickness and including folds, recesses and holes.

13. The support device according claim 1, wherein each of the first and second side clamp sections of the clamp is formed from a single sheet metal element having a uniform thickness and including folds, recesses and holes.

14. The support device according to claim 2, wherein said foot has two foot walls arranged spaced apart from and facing one another, said foot walls extending downwardly from opposite sides of the arcuate seat defining a passage between the arcuate seat and the support plate, and said fixing and clamping elements of the first and second side clamp sections comprise respective holes facing said passage for installing said tightening screw through the passage.

15. The support device according to claim 8, wherein the horizontal section of the first support plate element has guiding flanges perpendicular to the axis of the clamp configured for cooperating with edges perpendicular to the axis of the clamp of the horizontal section of the second support plate element for guiding relative positioning of the first and second support plate elements.

\* \* \* \* \*